UNITED STATES PATENT OFFICE.

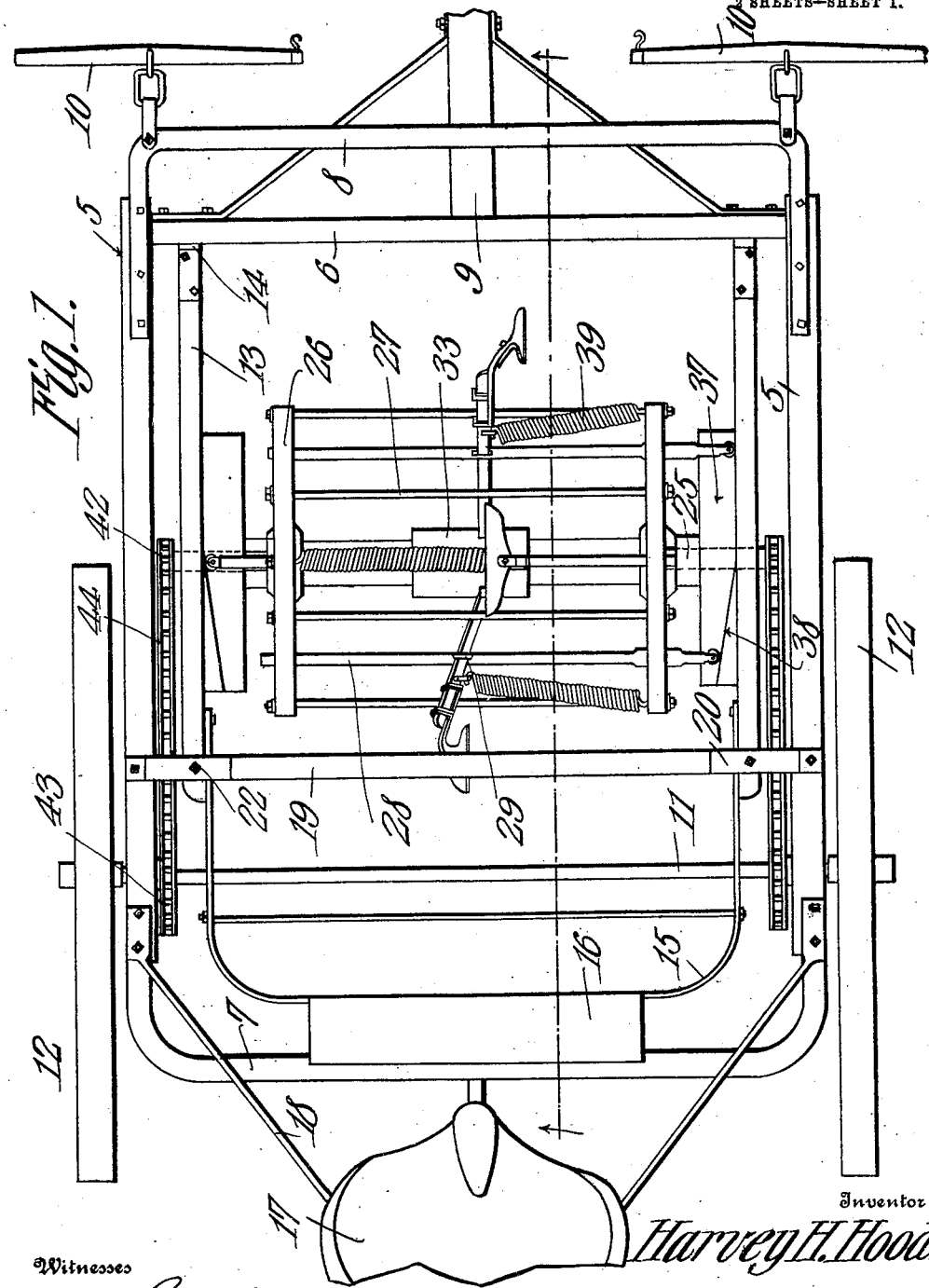

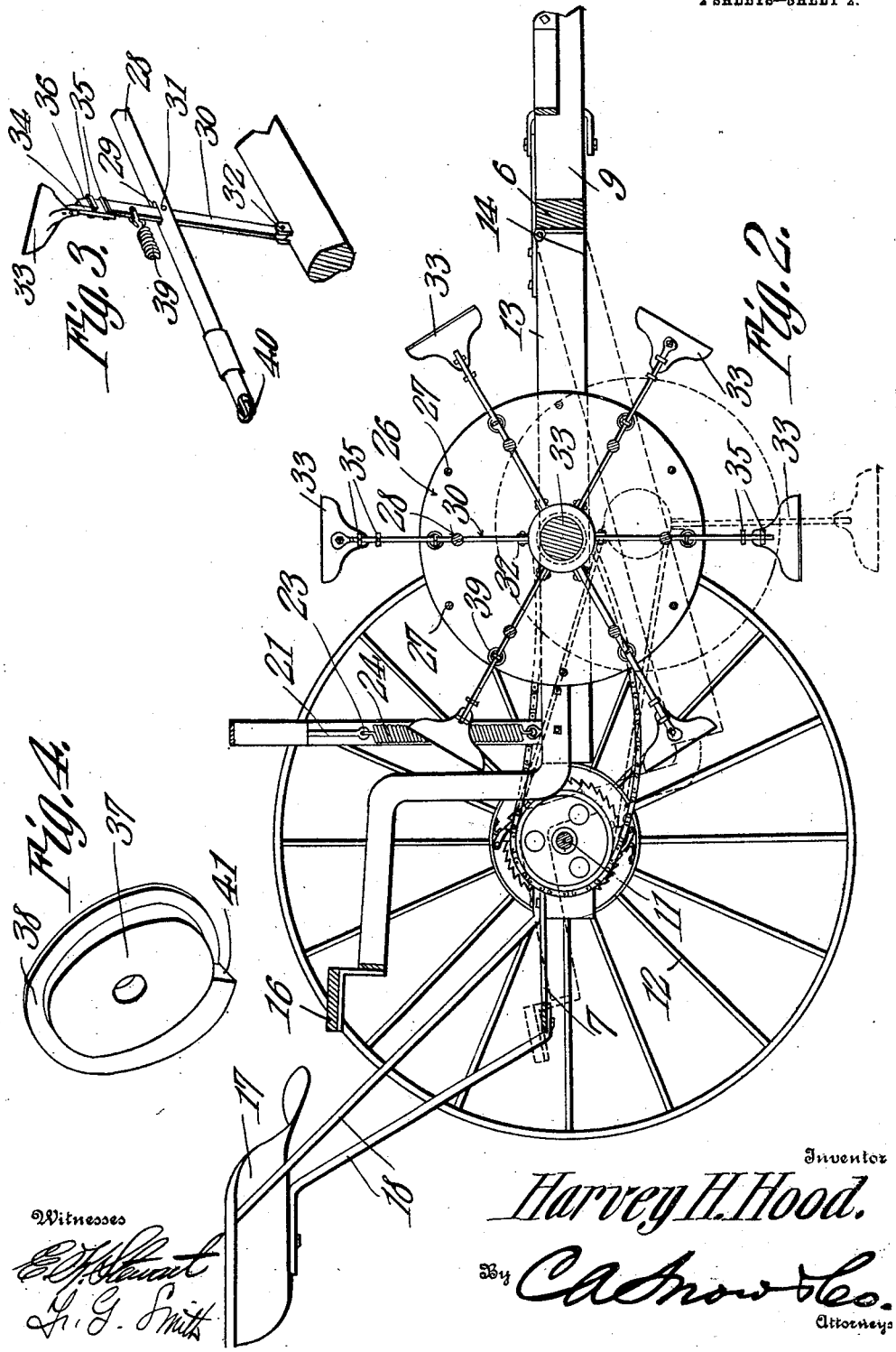

HARVEY HARRISON HOOD, OF CHARLOTTE, NORTH CAROLINA.

COTTON-CHOPPER.

No. 925,475.  Specification of Letters Patent.  Patented June 22, 1909.

Application filed September 23, 1908. Serial No. 454,291.

*To all whom it may concern:*

Be it known that I, HARVEY H. HOOD, a citizen of the United States, residing at Charlotte, in the county of Mecklenburg and State of North Carolina, have invented a new and useful Cotton-Chopper, of which the following is a specification.

This invention relates to cotton choppers, and more particularly to that class which are comprised of a frame mounted for travel and a skeleton drum mounted for rotation in the frame and carrying chopping hoes.

One of the primary objects of my invention is to obviate side draft, and, in order to attain this object, I mount the chopping hoes at the extremities of arms which are supported for rotation with a skeleton drum, providing two series of such arms and alternating the arms of one series with those of the other, the chopping hoes upon one series of arms being opposed to those upon the arms of the other series.

Another object of the invention is to provide means whereby the depth of cut of the hoes may be regulated, and, as a means for attaining this object, I mount the skeleton drum of the chopper in a frame which is mounted to swing vertically in the main frame, the first mentioned frame being supported at its rear end by means of springs which depend from an arched frame supported upon the main frame. These springs tend to normally hold the first mentioned frame raised, and I provide the said frame with an upward and rearward extension, carrying a foot-rest, which is located directly in front of the seat for the driver of the chopper, he being enabled, by the provision of such a structure, to exert a downward pressure upon the rear end of the said frame, to lower the frame and cause the chopping hoes to cut deeper into the soil.

In the accompanying drawings:—Figure 1 is a top plan view of the cotton chopper embodying my invention; Fig. 2 is a longitudinal sectional view therethrough, showing the supplemental frame in which the chopping mechanism is mounted, in normal position in full lines, and in lowered position in dotted lines; Fig. 3 is a detail perspective view, showing the manner of mounting the arms carrying the hoes and the elements associated therewith, and Fig. 4 is a detail perspective of one of the cam disks for operating the hoe arms.

As shown in the drawings, the cotton chopper embodying my invention, is comprised, broadly speaking, of a main frame and a supplemental frame, in which latter the chopping mechanism is mounted. The main frame of the machine is made up of side sills 5, a front end cross sill 6, and a cross-bar 7, which connects the rear ends of these side sills 5.

In addition to the front end cross sill, the forward ends of the side sills 5 are connected by means of spaced bars 8, between which extends the rear end of the pole or tongue 9, of the chopper, the draft devices, which are indicated by the numeral 10, being connected to the upper one of the two bars 8.

As clearly shown in Fig. 2 of the drawings, the main frame of the chopper is supported by an axle 11, upon which are keyed, or otherwise secured, wheels 12, it being understood that the axle rotates during the time of travel of the chopper.

The supplemental frame heretofore mentioned is comprised of side sills 13, which at their forward ends are hinged to the front end cross-sill 6, as indicated by the numeral 14, and are connected at their rear ends by means of a bar metal frame 15, which forms an extension of the said supplemental frame, and extends upwardly from the rear thereof and thence rearwardly therefrom above the axle 11, and to the rear of the same.

As illustrated in Figs. 1 and 2 of the drawings, the rear or connecting portions of the frame 15 supports a foot-rest 16, which extends transversely of the machine and directly in advance of a seat 17, supported by means of suitable standards 18, upon the main frame, at the rear end thereof.

As heretofore stated, the supplemental frame is yieldably supported in the main frame, so that it may be raised and lowered by swinging it upon the hinges 14, and as a means for so supporting the frame, an arched frame 19, is secured at its lower ends to the side sills 5, of the main frame. The frame 19 extends upwardly above the main frame of the machine and transversely thereof, and is formed adjacent its upper end with laterally off-set portions 20, through each of which is passed a short rod 21, the upper end of each rod 21 is screw-threaded and has engaged upon it a nut 22, which may be turned to adjust the respective rods through said off-set portion of the frame. Each of the rods is formed at its lower end with an eye 23, to which is connected the upper end of a spring 24, the lower ends of these springs being connected one to each of the side sills 6, of the supplemental frame. As will be readily understood, the tendency of these springs is to hold the supplemental frame raised, said frame being depressed to the proper degree by the driver of the machine placing his foot upon the foot-rest 16 and pressing downwardly.

Journaled in the side sills 13 of the supplemental frame of the machine is a shaft 25, and fixed upon this shaft, in concentric relation with respect thereto, one adjacent each of the side sills 13, is a pair of disks 26, which constitute the heads of the skeleton drum in which the hoe-carrying arms are mounted. These heads are connected in spaced relation by means of brace-rods 27, and each head is provided with a number of bearing openings through which are slidably passed bars 28. Each of the bars 28 is provided, at a point intermediate its ends, with a slot 29, and engaged through the slot 29 of each bar 28 is a hoe-carrying arm 30, the said arms being pivoted in the slots of the bars, as indicated by the numeral 31, and being also pivoted at their inner ends, as at 32, to an enlarged portion 33, of the shaft 25. At their outer ends, the hoe-carrying arms 30 are provided with hoes, each hoe comprising a blade portion 33 and a shank 34, which latter is formed with two or more yoke portions 35, which embrace the ends of the respective arms and through which are engaged set screws 36, for the purpose of securely holding the shank of the hoes in adjusted positions upon the arms.

The ends of the shaft 25 pass axially through disks 37, each of which is formed with a cam or volute portion 38, which extends around the periphery of the disks.

As clearly shown in the drawings, and particularly in Fig. 1 thereof, a spring 39, is connected at one end to each of the arms 30, and at its other end to one of the disks 26, the tendency of these springs being to rock the arms in the direction of the disks to which the springs are connected, the movement of the arms being limited by the engagement of the outer end of the bar 28 with the cam portions of the disks 37, there being rollers 40 arranged at the outer end of each of the bars 28 to travel over the said cam surface and reduce the friction as far as possible.

As will be observed in Fig. 4 of the drawings, one terminal of the cam portion of each disk is abrupt, as indicated by the numeral 41, so that, upon rotation of the shaft 25 together with the drum comprised of the head 26 and connecting rod 27, the bars 28 will be gradually moved away from the disks which they engage, and in the direction of the other disks, the arms 30 being rocked upon their pivots against the tension of the springs 39; it being understood that as the rollers at the outer ends of the bars 28 ride over the abrupt terminals of the cam portions of the respective disks, the springs will impart a quick swinging movement to the arms, so that the hoes carried by the arms will kick or dig into the soil and remove the proper number of plants.

As heretofore stated, and as shown in the drawings, the arms 30 are alternately arranged, or in other words, where one arm is arranged to move toward the right-hand side of the frame, the two adjacent arms will be arranged to move toward the left-hand side of the frame, the hoes at the ends of the arms being oppositely presented. As a result, the hoes of the machine will dig alternately to the right and left, side draft being in this manner obviated.

The rotation of the shaft 25 is had through the medium of sprocket gears 42 and 43 fixed upon the drums, shaft and the axle, and a sprocket chain 44 which is trained over the said gears.

Having described my invention, what I claim as new, and desire to secure, by Letters Patent, is:—

1. In a cotton chopper, a rotatable shaft, relatively fixed disks mounted upon the shaft, the said disks being provided with volute sections, arms pivotally connected with the shaft, chopping blades carried by the arms, longitudinally movable bars pivotally connected with the said arms, and bearing at their ends against the volute sections of the disks and tension springs operatively connected with the said arms.

2. In a cotton chopper, a rotatable shaft, relatively fixed disks mounted upon the shaft, said disks having each a volute section, arms pivotally connected with the shaft, chopping blades carried by the arms, disks mounted upon the shaft for rotation therewith, bars slidably mounted in the said disks and bearing at their ends against the volute sections of the first mentioned disks, and tension springs operatively connected with the arms.

3. In a cotton chopper, a rotatable shaft, relatively fixed disks mounted upon the shaft and provided with volute sections, arms pivotally connected with the shaft, chopping blades carried by the arms, disks mounted upon the shaft for rotation therewith, slidable bars passing transversely through the last mentioned disks and pivotally connected at intermediate points with intermediate portions of the said arms, said bars bearing at their ends against the relatively fixed disks, and springs operatively connected with the said arms.

4. In a cotton chopper, a main frame, an axle mounted in the main frame, a supplemental frame hinged at its forward end in the main frame at a point in advance of the axle, the said supplemental frame having its rear end portion extending upwardly directly in advance of said axle and thence rearwardly above the axle, a seat mounted in the main frame rearwardly of the axle and of the rear end of the supplemental frame, springs supporting the supplemental frame and normally holding the same in elevated position, and a foot rest carried transversely upon the supplemental frame at its rear end and extending directly in advance of the seat.

In testimony that I claim the foregoing as my own, I have hereto affixed my signature in the presence of two witnesses.

HARVEY HARRISON HOOD.

Witnesses:
    E. R. PRESTON,
    NEILL R. GRAHAM.